United States Patent [19]

McCarthy

[11] Patent Number: 4,594,889
[45] Date of Patent: Jun. 17, 1986

[54] MASS AIRFLOW SENSOR

[75] Inventor: Shaun L. McCarthy, Ann Arbor, Mich.

[73] Assignee: Ford Motor Company, Dearborn, Mich.

[21] Appl. No.: 678,901

[22] Filed: Dec. 6, 1984

[51] Int. Cl.⁴ .............................................. G01F 1/68
[52] U.S. Cl. ..................................................... 73/204
[58] Field of Search ................... 73/204; 29/610, 620; 156/644, 657, 662; 338/25, 308, 309, 318, 319; 427/101, 102, 103

[56] References Cited

U.S. PATENT DOCUMENTS

| | | |
|---|---|---|
| 3,996,799 | 12/1976 | van Putten ............................ 73/204 |
| 4,129,848 | 12/1978 | Frank et al. . |
| 4,343,768 | 8/1982 | Kimura .................................. 73/204 |
| 4,399,698 | 8/1983 | Hiromasa et al. ..................... 73/204 |
| 4,448,070 | 5/1984 | Ohyama et al. ....................... 73/204 |
| 4,478,076 | 10/1984 | Bohrer . |
| 4,478,077 | 10/1984 | Bohrer et al. . |
| 4,498,337 | 2/1985 | Gruner .................................. 338/25 |

FOREIGN PATENT DOCUMENTS 2138566 10/1984 United Kingdom .................. 73/204

OTHER PUBLICATIONS

Malin et al., "Mass Flow Meter" in IBM Technical Disclosure Bulletin, vol. 21 #8 1/79, p. 3227.
"Silicon Micromechanical Devices" by James B. Angell, Stephen C. Terry and Phillip W. Barth, Scientific American Magazine, Apr. 1983, pp. 44–55.

Primary Examiner—Herbert Goldstein
Attorney, Agent, or Firm—Peter Abolins; Keith L. Zerschling

[57] ABSTRACT

A mass airflow sensor includes a silicon substrate with integral, thin, elongated silicon members between openings through the silicon substrate. A silicon dioxide coating and a metal coating on the silicon member adapt it to function as a hot wire mass airflow sensor.

1 Claim, 7 Drawing Figures

MASS AIRFLOW SENSOR

BACKGROUND OF THE INVENTION

1. Field of the Invention

This invention relates to measuring air flow.

2. Prior Art

Known airflow meters include a hot film anemometer sensor. In accordance with such hot film wire or hot film anemometry, a thin film wire sensor is deposited on the substrate such as quartz or glass. It is also known to use a very fine platinum or tungsten wire freely supported or wound on a ceramic bobbin and maintained at a certain temperature above the intake air temperature by electronic sensing and feedback circuits. Any change in the airflow alters the cooling effect of the air on the heated wire. An electronic circuit can sense this change in heat transfer rate and record changes in the heating current to maintain the temperature of the wire at a set value.

Hot film anemometer sensors have generally had a low speed of response as a result of the low thermal conductivity of the quartz glass or fiber. Further, great care must be taken in handling the fine film coated quartz fiber in manufacturing the sensor elements. Connecting the quartz glass fiber or fine wire to a supporting structure and making electrical contact involves time consuming and delicate operation. Electronics used to amplify and power the sensor are placed external to the hot film anemometer sensor and interconnection between the electronics and the sensor is made by wires. The connections between the sensor element and the interconnection wires are a source of loss of reliability and increased unit costs. This results in limited manufacturing production capacity and increased unit costs.

U.S. Pat. No. 4,129,848 issued to Frank et al teaches a platinum film resistor device. A layer of quartz, deposited upon an insulative substrate, is sputter etched to produce etched pits in the surface thereof. A layer of platinum is deposited over the quartz layer. A second layer of quartz is deposited over the layer of platinum and the second layer of quartz is masked and chemically etched away in the regions where the platinum layer is to be removed. The exposed platinum and a portion of the second quartz layer are then sputter etched away leaving the platinum in a predetermined configuration.

There still remains a need for an airflow sensor haviang a good thermal conductivity which can be made at a very low unit cost with high reliability. Further, it would be advantageous to have a sensor which reduces system costs and improve overall system reliability as well as increasing packaging efficiency by including signal and power electronics on the same substrate as the airflow sensor element. These are some of the problems this invention overcomes.

SUMMARY OF THE INVENTION

A method of fabricating a mass air flow sensor includes the steps of forming a generally planar silicon substrate. A pair of spaced openings are formed through the silicon substrate so that a relatively elongated thin wire-like silicon region remains between the openings. After a silicon dioxide coating is formed on the silicon substrate, an elongated metal coating is applied to the silicon dioxide on the wire-like silicon region.

The device thus fabricated can be used as a low-cost, high speed sensing element of a mass air flow sensor for measuring air flow in an electronic engine control system. In accordance with an embodiment of this invention, there results a mounting of a thin film sensing element on a high thermally conductive wire substrate using low-cost manufacturing processes. Conventional photolithographic techniques can be used in processing. Because the thermal conductivity of the silicon is comparable to that of platinum, the hot film sensor on silicon has a speed of response comparable to that of a platinum hot wire anemometer sensor. The use of fabrication technology known in microelectronics industry applications results in low unit costs and high reliability because of the ease of large scale batch processing methods. In addition, fabricating the sensor out of silicon permits the incorporation of signal conditioning electronics on the same silicon substrate further reducing systems costs and improving overall system reliability as well as increasing packaging efficiency.

DETAILED DESCRIPTION OF THE INVENTION

Figure 1:
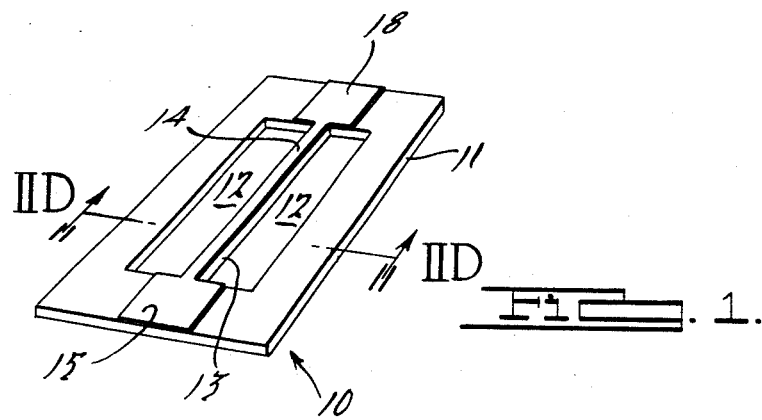
FIG. 1 is a perspective view of a airflow sensor in accordance with an embodiment of this invention.
Figure 2A:
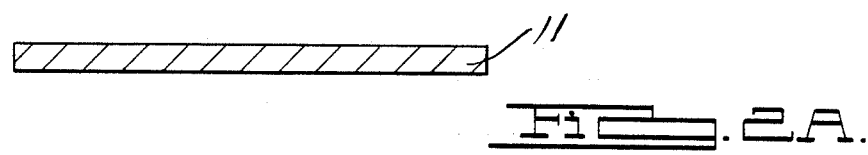
FIGS. 2A, 2B, 2C and 2D show sequential fabrication of a sensor in accordance with an embodiment of this invention.
Figure 2B:
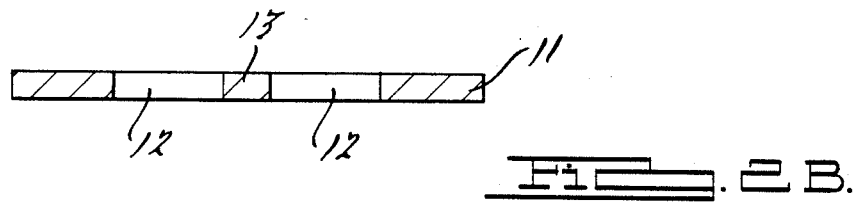
Figure 2C:
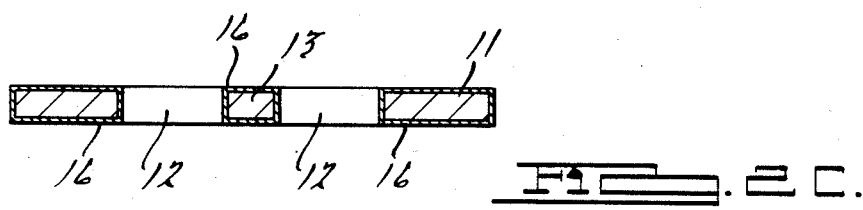
Figure 2D:
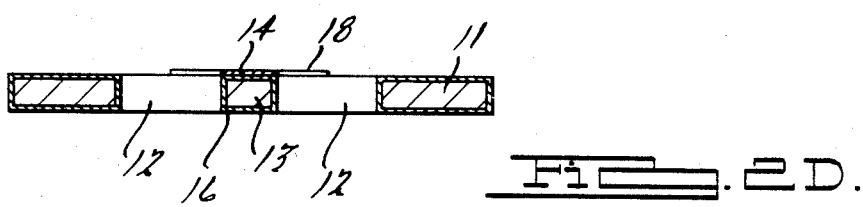

Referring to FIG. 1, a mass airflow sensor 10 includes a generally planar silicon substrate 11 having a pair of spaced openings 12. Intermediate openings 12 is an elongated silicon wire member 13. A layer of silicon dioxide 16 (FIGS. 2C and 2D) is formed on silicon substrate 11. A metal film 14 is formed over the silicon dioxide on silicon wire 13 and extends along the length of silicon wire 13 and has broadened terminals 18 and 15 at the ends of silicon wire 13 on silicon substrate 11.

Referring to FIGS. 2A, 2B, 2C and 2D, silicon substrate 11 is etched to form a wire with dimensions the range of about 1 mil to 3 mils in diameters and 3 millimeters in length. The wire is fabricated by chemical etching of silicon wafer material utilizing conventional photolithographic techniques. A thin coating of silicon dioxide, less than about 0.5 microns thick, covers silicon substrate 11 to electrically insulate it from metal film 14. This thin silicon dioxide coating doesnot appreciably reduce the speed of response of the resulting sensor. An advantageous material for metal film 14 is platinum.

Figure 3:
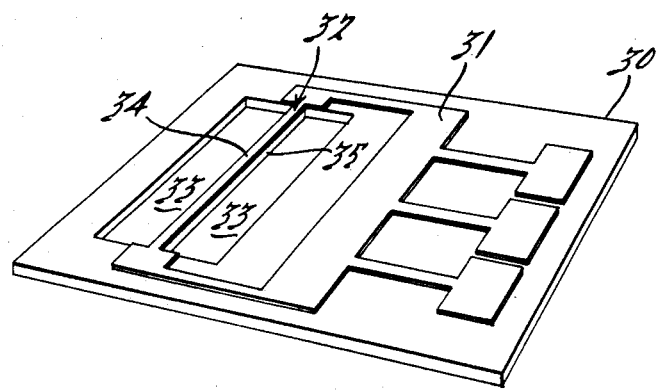
FIG. 3 is a perspective view of an airflow sensor in combination with an integrated circuit on the same silicon substrate in accordance with an embodiment of this invention.

Referring to FIG. 3, conventional microelectronics processing can be performed on a silicon substrate 30 to fabricate the necessary power control and sensor signal amplifying electronic circuitry 31. A hot film sensor element 32 is also formed at the appropriate time in the conventional microelectronics processing. A protective single layer film of silicon nitride or a protective double layer film of silicon oxide followed by silicon nitride prepared by conventional chemical vapor or physical vapor deposition methods is made to cover electronic circuitry 31 and airflow sensor elements 32. The silicon nitride protective layer is of the order of 1000 Å–2000 Å in thickness. The silicon oxide layer, if needed, is of like thickness. These layers are used to protect electronic circuitry 31 and airflow sensor elements 32 from subsequent chemical processing. A pair of openings 33 is formed through the protective layers on either side of an airflow sensor metal film 34 and an anisotropic etchant solution, such as aqueous potassium hydroxide solution or ethylene diamine-pyrocatechol solutions, is then used to dissolve away the silicon all the way through the thickness of substrate 30. The resulting structure is a fine silicon wire 35 with airflow sensor metal film 34 on the top.

Figure 4:
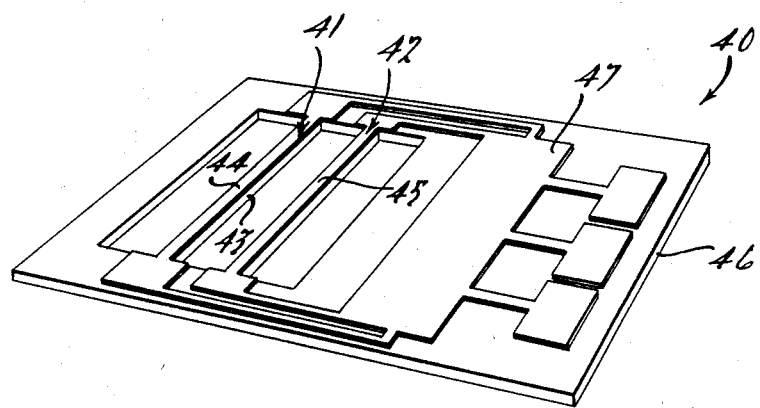
FIG. 4 is a perspective view of an airflow sensor in combination with an integrated circuit and air temperature sensor on the same silicon substrate in accordance with an embodiment of this invention.

Referring to FIG. 4, an airflow sensor system 40 compensates for different air temperatures in measuring air flow by adding an air temperature sensor 41 to an airflow sensor element 42 in a substrate 46. This can be done in accordance with this invention at little additional cost by forming a second silicon wire 43 with an air temperature sensor thin metal film 44 made of the same material as an airflow sensor thin metal film element 45 of airflow sensor element 42.

The incorporation of air temperature sensor 41 on the same substrate as airflow sensor element 42 results in advantageous performance and reliability improvements and a reduction in overall cost. If desired, power control and amplifier electronic circuitry 47 can also be formed on substrate 46 in a manner analogous to the discussion in connection with FIG. 3.

Various modifications and variations will no doubt occur to those skilled in the various arts to which this invention pertains. For example, the relative shape and size of the openings in the substrate may be varied from that disclosed herein. These and all other variations which basically rely on the teachings through which this disclosure has advanced the art are properly considered within the scope of this invention.

I claim:
1. A mass airflow sensor including:
   a generally planar silicon substrate with a first, a second, and a third opening formed through said substrate and a first integral, elongated wire-like silicon member between said first and second openings and a second integral, elongated wire-like silicon member between said second and third openings;
   a silicon dioxide coating formed on said first and second silicon members;
   a first platinum metal coating formed on said silicon dioxide coating on said first silicon member adapted to be used as a hot wire mass airflow sensor;
   a pair of conductive terminals, one terminal positioned at each end of said first silicon member on said silicon dioxide coating and in contact with said first platinum metal coating;
   a second platinum metal coating formed on said silicon dioxide coating on said second silicon member adapted to be used as an air temperature sensor;
   said silicon dioxide coating having a thickness of about 0.5 microns;
   said first and second silicon members each having a length of about 3 millimeters and a cross section dimension approximately in the range of about 1 mil to 3 mils; and
   an integrated circuit formed on said silicon substrate to cooperate with the mass airflow sensor silicon element and the air temperature sensor silicon element and to contact said first and second metal coatings on said first and second silicon members, respectively.

* * * * *